US008824697B2

(12) United States Patent
Christoph

(10) Patent No.: US 8,824,697 B2
(45) Date of Patent: Sep. 2, 2014

(54) PASSENGER COMPARTMENT COMMUNICATION SYSTEM

(75) Inventor: Markus Christoph, Straubing (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1257 days.

(21) Appl. No.: 12/693,176

(22) Filed: Jan. 25, 2010

(65) Prior Publication Data

US 2010/0189275 A1 Jul. 29, 2010

(30) Foreign Application Priority Data

Jan. 23, 2009 (EP) .................................... 09151259

(51) Int. Cl.
*H04B 1/00* (2006.01)
*H04R 3/00* (2006.01)
*H02B 1/00* (2006.01)

(52) U.S. Cl.
USPC .............................. 381/86; 381/122; 381/123

(58) Field of Classification Search
USPC ................. 381/86, 66, 110, 123, 91, 92, 122, 381/71.1–71.14
See application file for complete search history.

(56) References Cited

U.S. PATENT DOCUMENTS

| | | | | |
|---|---|---|---|---|
| 4,454,609 | A | 6/1984 | Kates | |
| 5,602,928 | A | 2/1997 | Eriksson et al. | |
| 5,699,437 | A * | 12/1997 | Finn | 381/71.7 |
| 6,363,156 | B1 * | 3/2002 | Roddy | 381/86 |
| 6,535,609 | B1 * | 3/2003 | Finn et al. | 381/86 |
| 7,231,051 | B2 * | 6/2007 | Paviot et al. | 381/56 |
| 7,415,116 | B1 * | 8/2008 | Fels | 381/86 |
| 7,515,721 | B2 * | 4/2009 | Tashev et al. | 381/92 |
| 8,036,715 | B2 * | 10/2011 | Buck et al. | 455/569.2 |
| 8,233,642 | B2 * | 7/2012 | Mao | 381/122 |
| 8,275,145 | B2 * | 9/2012 | Buck et al. | 381/86 |
| 8,306,234 | B2 * | 11/2012 | Christoph et al. | 381/17 |
| 2003/0063756 | A1 * | 4/2003 | Geerlings et al. | 381/86 |
| 2005/0119876 | A1 | 6/2005 | Ferrieux et al. | |
| 2005/0119879 | A1 | 6/2005 | Sung et al. | |
| 2006/0080089 | A1 | 4/2006 | Vierthaler et al. | |
| 2007/0021958 | A1 | 1/2007 | Visser et al. | |
| 2008/0031468 | A1 | 2/2008 | Christoph et al. | |
| 2009/0055180 | A1 * | 2/2009 | Coon et al. | 704/251 |

FOREIGN PATENT DOCUMENTS

| | | |
|---|---|---|
| WO | 2008056334 | 5/2008 |

* cited by examiner

*Primary Examiner* — Xu Mei
(74) *Attorney, Agent, or Firm* — O'Shea Getz P.C.

(57) ABSTRACT

A communication system for a passenger compartment includes at least two microphone arrays arranged within first and second regions, respectively, in the passenger compartment, and at least two loudspeakers and a signal processor connected to the microphone arrays and to the loudspeaker. Each microphone array has at least two microphones and provides an audio signal. Each loudspeaker is located within a different one of the first and the second regions. The signal processor processes the audio signal from the microphone array within the first region and provides the processed audio signal to the loudspeaker located within the second region.

31 Claims, 2 Drawing Sheets

PASSENGER COMPARTMENT COMMUNICATION SYSTEM

CLAIM OF PRIORITY

This patent application claims priority from European Patent Application No. 09 151 259.0 filed on Jan. 23, 2009, which is hereby incorporated by reference in its entirety.

FIELD OF TECHNOLOGY

The invention relates to a passenger compartment communication system and, in particular, to a system for facilitating voice communication in a noise filled environment.

RELATED ART

In a noise-filled environment, verbal communication between two or more people is often difficult, or even impossible. This is particularly true when the noise has a similar or a higher volume level to that of the voices of the people speaking. One example of such an environment is a passenger compartment of a motor vehicle. In a typical passenger compartment, background noise may have a relatively high or a relatively low volume depending upon the operating state of the vehicle. Additionally, voices of passengers may have relatively high or relatively low perceived volumes depending upon where the passengers are seated. As such, a speaker (e.g., a driver or a passenger) may have to increase his/her voice level to be heard over the background noise. Such an increase in voice level, however, can be unpleasant for the speaker, and is not always sufficient to ensure verbal comprehension.

Modern motor vehicles are increasingly equipped with so-called entertainment systems which provide high-quality audio signals via a plurality of loudspeakers arranged in their passenger compartment. Such systems may also be used as passenger compartment communication systems, for example, that include hands-free telephone communication systems.

In order to improve the verbal communication between passengers, a passenger compartment communication system typically includes a plurality of microphones arranged, for example, in an inner roof lining of the vehicle to reduce the distance between each microphone and the respective speaker.

However, even when "good" positions are selected for the microphones, the distance between a mouth of a speaker and a respective one of the microphones may be up to approximately half a meter. This distance can lead to undesired feedback and echoes. For example, when a driver is speaking to passengers in the rear region of the passenger compartment, his voice signal is detected by a microphone and radiated to the passengers via rear loudspeaker. However, the radiated voice signal may also be detected by the microphone, which can generate an echo. This process can result in further delayed, attenuated and very disruptive repeated reproduction of the same voice content.

A further drawback of conventional passenger compartment communication systems is that as the distance between the speaker and microphone increases, the signal-to-noise ratio decreases. As a result, the voice signal which is reproduced via the loudspeakers can add to and increase the volume of the undesired noise as the distance from the microphone increases. Accordingly, there is a need for an improved passenger compartment communication system.

SUMMARY OF THE INVENTION

According to one aspect of the invention, a communication system for a passenger compartment includes at least two microphone arrays respectively arranged within first and second regions in the passenger compartment, at least two loudspeakers and a signal-processing arrangement connected to the microphone arrays and the loudspeakers. Each microphone array has at least two microphones and is operable to provide an audio signal. Each loudspeaker is located within a different one of the first and the second regions. The signal-processing arrangement processes the audio signal from the microphone array within the first region and provides the processed audio signal to the loudspeaker located within the second region.

According to another aspect of the invention, a method is provided for improving voice communication in an environment subject to interference. The method includes providing at least four microphone arrays arranged in the environment, each microphone array including at least two microphones, where a first one of the microphone arrays is disposed within a first region. Four signal-processing arrangements are provided, where each signal-processing arrangement receives at least two audio signals from a respective one of the microphone arrays; and processes the received audio signals to provide corresponding processed output signals. The processed output signals from the first one of the microphone arrays to a first one of a plurality of loudspeakers that is disposed within a second region.

According to another aspect of the invention, a communication system for a passenger compartment of a motor vehicle includes first and second microphone arrays, first and second loudspeakers and a signal-processing arrangement. Each microphone array includes a plurality of microphones. The first microphone array is adapted to provide a plurality of first audio signals and is located in a first region of the passenger compartment. The second microphone array is adapted to provide a plurality of second audio signals and is located in a second region of the passenger compartment, where the first region is different than the second region. The first loudspeaker is located in the first region, and the second loudspeaker is located in the second region. The signal-processing arrangement receives the first and the second audio signals, and provides a first conditioned audio signal derived from the first audio signal to the second loudspeaker.

According to another aspect of the invention, a method is provided for improving voice communication in an environment subject to interference. The method detects sound in a first region of the environment via a first array of microphones to provide a plurality of first audio signals. Sound in a second region of the environment is detected via a second array of microphones to provide a plurality of second audio signals. Signal processing is performed on at least one of the first audio signals to provide a first conditioned signal and at least one of the second audio signals to provide a second conditioned signal via a signal processing arrangement. Audio indicative of at least one of the first conditioned signal is reproduced in the second region of the environment via a second loudspeaker and the second conditioned signal in the first region of the environment via a first loudspeaker.

BRIEF DESCRIPTION OF THE DRAWINGS

The invention can be better understood with reference to the following drawings and description. The components in the FIGS. are not necessarily drawn to scale, instead emphasis is placed upon illustrating the principles of the invention.

Moreover, in the FIGS., like reference numerals designate corresponding parts. In the drawings.

DETAILED DESCRIPTION

Figure 1:
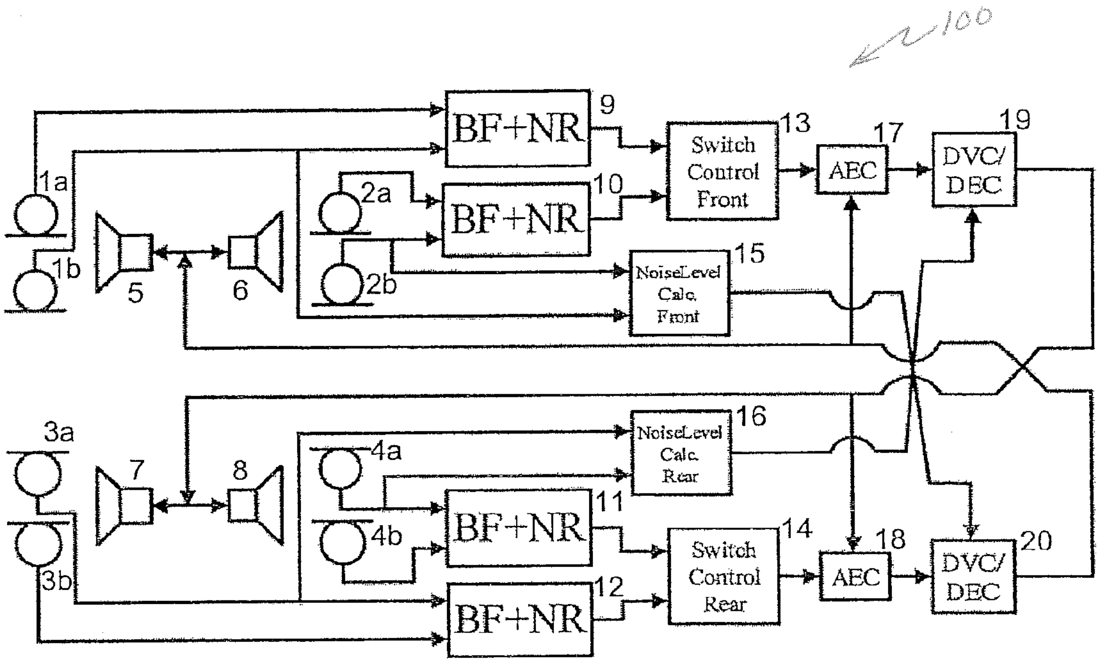
FIG. 1 is a block diagram of one embodiment of a passenger compartment communication system.

Sound that fails to inform a listener and/or that is perceived by the listener as disruptive is generally referred to as noise. Some common types of noise include, for example, ambient noise, driving noise triggered by mechanical vibrations, wind noise, as well as noise generated by an engine, tires, a blower (e.g., an air vent fan) and other assemblies located in the motor vehicle. The volume (or signal level) of such driving noise typically depends on the current speed of the vehicle, road conditions and other operating states of the vehicle. When noise is perceived as disruptive, it is referred to as “interference noise”. In some circumstances, even music and/or voices of passengers can have a disruptive and undesired effect on a desired verbal communication within a passenger compartment of the vehicle.

Undesired noise may be suppressed or reduced via active noise control arrangements by generating extinction waves and superimposing these waves on the undesired noise. For example, these extinction waves typically have substantially equal amplitudes and frequencies to those of the undesired noise; however, their phase is shifted by 180 degrees. Therefore, when an extinction signal is superimposed on the undesired interference signal, the undesired noise is ideally completely extinguished/attenuated. The undesired noise may be further reduced, for example, by improving the signal-to-noise ratio and by suppressing acoustic echoes using Acoustic Echo Cancellation (AEC).

A technique for noise suppression in a passenger compartment of a motor vehicle includes detecting (i.e., picking-up) voice signals of speakers in the motor vehicle, post-processing the detected signals to optimize the signal-to-noise ratio, and post-processing the detected signals to optimize echo cancellation. In some embodiments, the post-processing for echo cancellation can account for whether the detected signal includes voice signal components, and if so, its signal level.

An alternative or additional measure for noise suppression includes optimizing the signal-to-noise ratio of the voice signal upon detection. For example, the signal-to-noise ratio of a voice signal in an environment with interference noise may be improved by using a suitable arrangement and selection of microphones. The microphones may be positioned as close as possible to the sound source (i.e., a respective vehicle occupant), and in particular a suitable characteristic (e.g., a directional characteristic) of the microphone may be selected.

The voice signals are detected from a preferred direction (e.g., the direction of the respective vehicle occupant) and interference signals from all other directions in the passenger compartment are correspondingly attenuated. As a result, the overall power of the detected interference signal is already lowered when the voice signal is detected since the interference signal is essentially isotropic in the passenger compartment. That is, the interference signal is incident with approximately the same strength from all directions. The power of the detected useful signal, such as the desired voice signal, remains essentially constant, such that an overall improved signal-to-noise ratio of the voice signal component in the microphone signal is obtained.

An alternative or additional measure for noise suppression includes detecting the voice signals with a directional microphone such that the voice signal includes minimal or no distortions. Such distortions of a voice signal can not be avoided with prior art noise suppression algorithms when a significant degree of improvement of the signal-to-noise ratio is to be achieved. Thus, distortions in the voice signal which is reproduced after processing should be relatively small such that they are not felt to be disruptive when the voice signal is played back.

A disadvantage of high-quality directional microphones is their relatively high cost. For this reason, the present embodiment substantially models the directional effect of the directional microphones using a plurality of simple, and therefore more cost-effective, omni-directional microphones arranged in a microphone array having at least two microphones. This modelling includes pre-filtering the output signals of individual microphones in the microphone array, which is also referred to as beamforming (BF). The manner in which such beamforming is performed depends on the respective individual properties of the motor vehicle such as, for example, the configuration of the passenger compartment and the sitting positions of the passengers. A high-quality solution may comprise, for example, using a separate, assigned microphone array for each sitting position from which voice signals are to be picked-up. In this context, the directional effect of the microphone array is defined individually by beamforming. Alternatively, the beamforming may be carried out using directional microphones instead of omnidirectional microphones. Thus, the focussing effect of beamforming may be further increased.

Beamforming is a signal processing technique used in sensor arrays (e.g., microphone arrays) for directional signal transmission or reception. This spatial selectivity is achieved by using adaptive or fixed receive/transmit beam patterns. Beamforming takes advantage of interference to change the directionality of the array. During audio transmission, a beamformer controls the phase and relative amplitude of the signal at each transmitter (e.g., a loudspeaker) in order to create a pattern of constructive and destructive interference in the wavefront. During audio detection, information from different sensors (e.g., microphones) is combined such that the expected pattern of radiation is observed.

To decrease costs associated with beamforming, a separate, individual beamformer for each sitting position may be replaced with a common beamformer for both a front region and a rear region of the passenger compartment. For example, in such an arrangement, each of the beamformers may be configured such that it has a plurality of preferred directions of sensitivity, which are aligned with the respective sitting positions (i.e., the positions of the speakers).

In another embodiment, the incoming microphone signals are processed according to a Blind Source Separation (BSS) algorithm. Blind Source Separation, also known as Blind Signal Separation, refers to the separation of a set of signals from a set of mixed signals, without the aid of information (or with very little information) about the source signals or the mixing process. Blind signal separation assumes that the source signals do not correlate with each other. For example, the signals may be mutually statistically independent or decorrelated. Therefore, blind signal separation separates a set of signals into a set of other signals, such that the regularity of each resulting signal is increased (e.g., maximized), and the regularity between the signals is reduced (e.g., minimize) that is statistical independence is maximized. Since temporal redundancies (statistical regularities in the time domain) are "clumped" into the resulting signals, the resulting signals can be more effectively deconvolved than the original signals. Thus, such an algorithm performs automatic and adaptive separation of a plurality of voice signals by forming preferred directions of the sensitivity in the corresponding spatial directions. The quality and the level of interference noise fields which are present determine how well this algorithm can form corresponding preferred directions for the acquisition of the voice signals.

Another option is to employ acoustical and/or electrical Active Noise Cancellation (ANC) algorithms. Acoustical ANC reduces the acoustical disturbance and electrical ANC avoids reproduction of undesired noise reproduced by the loudspeakers, in particular at the positions of interest (e.g., the seats). The noise-cancellation system/algorithm emits a sound wave with the same amplitude and the opposite polarity (in anti-phase) to the original sound. The waves combine to form a new wave, in a process called interference, and effectively cancel each other out. This effect is called "phase cancellation". In small enclosed spaces (e.g. a passenger compartment of a car), such global cancellation can be achieved using a plurality of speakers and feedback microphones, and measurement of the modal responses of the enclosure. Modern ANC is achieved through the use of a processor, which analyzes the waveform of the background aural or nonaural noise, then generates a polarisation reversed waveform to cancel it out by interference. This reversed waveform has identical or directly proportional amplitude to the waveform of the original noise; however, its polarity is reversed. This creates the destructive interference that reduces the amplitude of the perceived noise.

The above-mentioned algorithms, however, cannot sufficiently reduce interference noise components in all circumstances. For example, a desired signal-to-noise ratio frequently is difficult to achieve, in particular, in moving vehicles. When the undesired interference noise cannot be sufficiently reduced, it is fed back into the passenger compartment via the loudspeakers together with the desired voice signal. This feedback can cause an undesirable increase in the overall energy level of the interference noise.

Additional single-channel or multi-channel noise reduction algorithms are used in downstream digital signal processing to prevent the increase of the overall energy level of the interference noise. However, to avoid undesirably high distortion of the resulting voice signals, these algorithms are minimally applied. A further reduction in the interference noise components is achieved by applying the measures as described below.

It is assumed that during a typical communication between two people in a passenger compartment of a motor vehicle, for example between a passenger (e.g., the driver) in a front row seat and a passenger in a rear row seat, only one person speaks at a given time. In this situation, if a beamformer arrangement received signals from all the microphones or microphone arrays in the passenger compartment of the vehicle, signal components from spatial directions from which there is no voice signal would also be processed. As previously described, these additional signals may lead to an undesired and disadvantageous increase in the overall energy level of the interference noise components.

For this reason, switching units are configured into the present communication system that relay a signal from the microphones or microphone arrays assigned to a specific sitting position when that signal includes voice signal components. The signal components of other microphones or microphone arrays which are assigned to a specific sitting position are correspondingly suppressed or attenuated if they include little or no voice signal components. For example, where a driver is talking to a passenger in a rear seat and the other seats are (i) not occupied or (ii) passengers sitting on them are not speaking, interference noise components are not passed on from these directions or from the microphones which are assigned to these other seats.

In this way, the signal-to-noise ratio is increased; i.e., the strength of the voice signal is increased relative to the strength of the interference noise. Additionally, this increase reduces the need for increasing the use of the noise-reduction algorithms, which may create undesirable distortions in the voice signal.

In the present embodiment, voice detection is used to determine whether voice signal components are present in the signal under investigation; i.e., in a detected signal. Where it is determined that the detected signal has one or more voice signal components, the level of the voice signal components is determined.

Typically, pure voice detection is technically easier and therefore more cost-effective to implement than voice recognition. Voice activity detection (VAD), also known as speech activity detection or speech detection, is a technique wherein the presence or absence of human speech is detected in audio components which may also contain music, noise, or other sound. The basic elements of a VAD algorithm may include the following steps:

1. Noise reduction, e.g., via spectral subtraction.
2. Calculating some features or quantities from a section of the input signal.
3. Supplying a classification rule is applied to classify the section as speech or non-speech. Typically, this classification rule is whether the calculated value(s) exceed certain threshold(s).

In contrast, voice recognition, also known as speech recognition, is a technology designed to recognize spoken words through digitization and algorithm-based programming.

As mentioned above, further signal processing of the microphone signals may be carried out to suppress undesired echoes in the reproduced voice signals using known AEC algorithms that may be implemented in a digital signal processor. An individually assigned AEC algorithm may be applied to any microphone output signal or beamformer output signal. However, for the sake of a cost-effective implementation of the communication system, it is taken into account that typical AEC algorithms require significant resources both in processing time and memory.

In some embodiments, to reduce the number of required AEC algorithms, only the voice signal that is being conducted to the respective loudspeakers in the passenger compartment at that particular time is used as the reference signal for echo compensation for the AEC algorithm. This voice signal may include an individual voice signal or a plurality of voice signals which are mixed together.

Since the communication system does not know which person a speaker wishes to address, the voice signal of the speaker is output simultaneously at all the loudspeaker positions which are at a distance from the position of the speaker. For example, where a driver of the motor vehicle is the speaker, his voice signal is output on all the existing rear loudspeaker channels of the passenger compartment of the vehicle. As a result, for example in a 4-way audio system having front left, front right, rear left and rear right loudspeakers, the number of the AEC systems can be reduced from four to two where the voice signals to the front and rear loudspeaker groups are respectively each processed by an AEC system. In this way it is possible to reduce the technical expenditure and therefore the cost of the communication system.

The AEC systems may be implemented in the time domain or frequency domain.

Voice signals from a passenger compartment communication system should be reproduced in amplified form via the audio system where background noise or interference noise is so disruptive that a normal conversation is no longer possible. For this reason, arrangements for dynamic volume control (DVC) of the voice signal output by the loudspeakers are integrated into the communication system. The volume with which the voice signals are reproduced is automatically adapted as a function of the current voice signal and noise levels.

Interference noise that typically occurs in moving vehicles has a spectral distribution with particularly high levels at low frequencies. As a result, there can be a high degree of overlap or masking of useful signals (e.g., voice signals) by undesired interference noise particularly at low frequencies. Such overlap can be counteracted with an equalizer having Dynamic Equalization Control (DEC), which adapts automatically to the respective spectral distribution of the interference signal. Arrangements and algorithms for dynamic volume control and dynamic equalization control may be implemented either in the time domain or in the frequency domain. Furthermore, a psycho-acoustic masking model may be applied to achieve an aural compensated adaptation of the volume and of the frequency response of the reproduced voice signals.

FIG. 1 is a block illustration of a communication system 100 that includes a plurality of microphone pairs 1-4 and a plurality of loudspeakers 5-8. Each microphone pair 1-4 includes two or more microphones 1*a* and 1*b*, 2*a* and 2*b*, 3*a* and 3*b*, 4*a* and 4*b*. The microphones 1*a* and 1*b* are configured to detect speech from a speaker sitting in a front left seat (or sitting position) of a vehicle. The microphones 2*a* and 2*b* are configured to detect speech from a speaker sitting in a front right seat. The microphones 3*a* and 3*b* are configured to detect speech from a speaker sitting in a rear left seat. The microphones 4*a* and 4*b* are configured to detect speech from a speaker sitting in a rear right seat. In this configuration, each microphone pair 1-4 is disposed proximate to a potential voice signal source (e.g., a speaker). For example, each microphone pair can be located in an inner roof lining of the passenger compartment above one of the potential speakers. In a preferred embodiment, the loudspeakers 5-8 are loudspeakers for a vehicle entertainment system. The loudspeakers 5-8 include a front left loudspeaker 5, a front right loudspeaker 6, a rear left loudspeaker 7 and a rear right loudspeaker 8.

The communication system also includes a plurality of signal processing units. The signal processing units include a plurality of signal processing units 9-12 for beamforming and suppressing noise (hereinafter "beamforming and noise suppression units"), and a plurality of signal-processing units 13 and 14 for detecting voice signals and weighting (i.e., amplifying or damping) voice signals (hereinafter "detection and weighting units"). The beamforming and noise suppression unit 9 is coupled to the microphones 1*a* and 1*b* (sitting position front left). The beamforming and noise suppression unit 10 is coupled to the microphones 2*a* and 2*b* (sitting position front right). The beamforming and noise suppression unit 11 is coupled to the microphones 3*a* and 3*b* (sitting position rear left). The beamforming and noise suppression unit 12 is coupled to the microphones 4*a* and 4*b* (sitting position rear right). The front detection and weighting unit 13 is coupled to the beamforming and noise suppression units 9 and 10. The rear detection and weighting unit 14 is coupled to the beamforming and noise suppression units 11 and 12. In the embodiment in FIG. 1, the communication system also includes a plurality of signal-processing units 15 and 16 for determining a noise signal level (hereinafter "noise level determination units"), a plurality of signal-processing units 17 and 18 for suppressing acoustic echoes (hereinafter "echo suppression units"), and a plurality of signal-processing units 19 and 20 for providing dynamic volume control and/or frequency equalization control (DVC/DEC) (hereinafter the "DVC/DEC units").

The beamforming and noise suppression units 9 and 10 are located upstream of and are coupled to the detection and weighting unit 13. The detection and weighting unit 13 is disposed upstream of and is coupled to the echo suppression unit 17. The echo suppression unit 17 is disposed upstream of and is coupled to the DVC/DEC unit 19, an output of which is supplied to the rear left and the rear right loudspeakers 7 and 8. The output of the DVC/DEC unit 19 is further supplied to the echo suppression unit 18. The microphones 1*b* and 2*b* are located upstream of and coupled to the noise level determination unit 15. The noise level determination unit 15 provides a control signal to the DVC/DEC unit 20.

The beamforming and noise suppression units 11 and 12 are disposed upstream of and are coupled to the detection and weighting unit 14. The detection and weighting unit 14 is disposed upstream of and is coupled to the echo suppression unit 18. The echo suppression unit 18 is disposed upstream of and is coupled to the DVC/DEC unit 20, an output of which is supplied to the front left and the front right loudspeakers 5 and 6. The output of the DVC/DEC unit 20 is also supplied to the echo suppression unit 17. The microphones 3*a* and 4*a* are disposed upstream of and coupled to the noise level determination unit 16. The noise level determination unit 16 provides a control signal to the DVC/DEC unit 19.

In the system of FIG. 1, each microphone pair 1-4 is respectively assigned to one of the four sitting positions (e.g., front left, front right, rear left and rear right) in the passenger compartment. The beamforming and noise suppression units 9-12 process microphone signals from the microphone pairs 1-4 to generate a directional characteristic of the microphone arrays. As set for above, this procedure is known as beamforming.

The beamforming and noise suppression units 9-12 enhance the resulting signal of the beamforming procedure using multi-channel noise reduction techniques to improve the signal-to-noise ratio between the desired voice signals and undesired interference signals. The undesired interference signals may include, for example, driving noise, wind noise, etc. as set forth above for example.

The output signals of the beamforming and noise suppression units 9 and 10 (i.e., the correspondingly conditioned signals of the front left and the front right microphone pairs 1 and 2) are provided to the detection and weighting unit 13. The detection and weighting unit 13 checks these signals for voice signal components using voice signal detection techniques. When the detection and weighting unit 13 determines that one or more of the signals includes a voice signal component, it determines whether these voice signal components are significant voice signal components. For example, in one embodiment, the detection and weighting unit 13 compares the detected voice signal component to a predefined threshold value. When the voice signal component exceeds the predefined threshold value, the voice signal component is determined to be a significant voice signal component and is output for further processing. In this configuration, the detection and weighting unit 13 further functions as a switch control unit.

When there are significant voice signal components present in the output signals from both the microphone pairs 1 and 2, a blend of these voice signal components is output for further processing. A blend of two voice signal components can be formed, for example, using a weighting corresponding to the signal strength of each voice signal component. For example, where the voice signal component corresponding to the microphone pair 2 is stronger than the voice signal component corresponding to the microphone pair 1, the voice signal from the microphone pair 2 would be weighted greater (or stronger) than the voice signal from the microphone pair 1.

Using a similar procedure as described above, the output signals of the beamforming and noise suppression units 11 and 12 (i.e., the correspondingly conditioned signals of the front left and the front right microphone pairs 3 and 4) are provided to the detection and weighting unit 14. When the detection and weighting unit 14 determines that one or more significant voice signal components are present in the signals from microphone pairs 3 and 4, the individual significant voice signal component or a blend of the significant voice signal components is/are output for further processing.

The voice signal that is extracted from the two front sitting positions (e.g., via the microphone pairs 1 and 2) is post-processed and then reproduced by the rear left and the rear right loudspeakers 7 and 8. The voice signal that is extracted from the two rear sitting positions (e.g., via the microphone pairs 3 and 4) is post-processed and then reproduced by the front left and the front right loudspeakers 5 and 6.

During the post-processing procedure, the extracted voice signals corresponding to the front sitting positions are conditioned in the echo suppression unit 17 and the DVC/DEC unit 19. The echo suppression unit 17 suppresses echoes occurring in the voice signal components in the output signal of the detection and weighting unit 13. During this echo compensation, the output signal from the DVC/DEC unit 20 for the rear voice signal components is used as a reference signal. The DVC/DEC unit 19 performs dynamic volume control (DVC) and/or frequency equalization control (DEC) on the echo compensated signal from the echo suppression unit 17 using known algorithms. During this DVC/DEC, the output signal from the noise level determination unit 16 is used to determine the interference noise level at the location of the desired reproduction (e.g., the rear sitting positions).

Similarly, the extracted voice signals corresponding to the rear sitting positions are conditioned in the echo suppression unit 18 and the DVC/DEC unit 20. The echo suppression unit 18 suppresses echoes occurring in the voice signal components in the output signal of the detection and weighting unit 14. During this echo compensation, the output signal from the DVC/DEC unit 19 for the front voice signal components is used as a reference signal. The DVC/DEC unit 20 performs dynamic volume control (DVC) and/or frequency equalization control (DEC) on the echo compensated signal from the echo suppression unit 18. During this DVC/DEC, the output signal from the noise level determination unit 15 is used to determine the interference noise level at the location of the desired reproduction (e.g., the front sitting positions).

The post-processed voice signals corresponding to the front microphone pairs 1 (front left) and 2 (front right) are reproduced for occupants sitting in the rear seats via the rear left and the rear right loudspeakers 7 and 8. In a similar fashion, the post-processed voice signals corresponding to the rear microphone pairs 3 (rear left) and 4 (rear right) are reproduced for the occupants sitting in the front seats via front left and the front right loudspeakers 5 and 6.

Notably, the communication system is not limited to including the combined DVC/DEC units as illustrated in FIG. 1. For example, in an alternate embodiment, the switch controls function of one or more of the detection and weighting units 13 and 14 are omitted such that each beamforming and noise suppression unit 9-12 communicates with an individual DVC/DEC and AEC.

Figure 2:
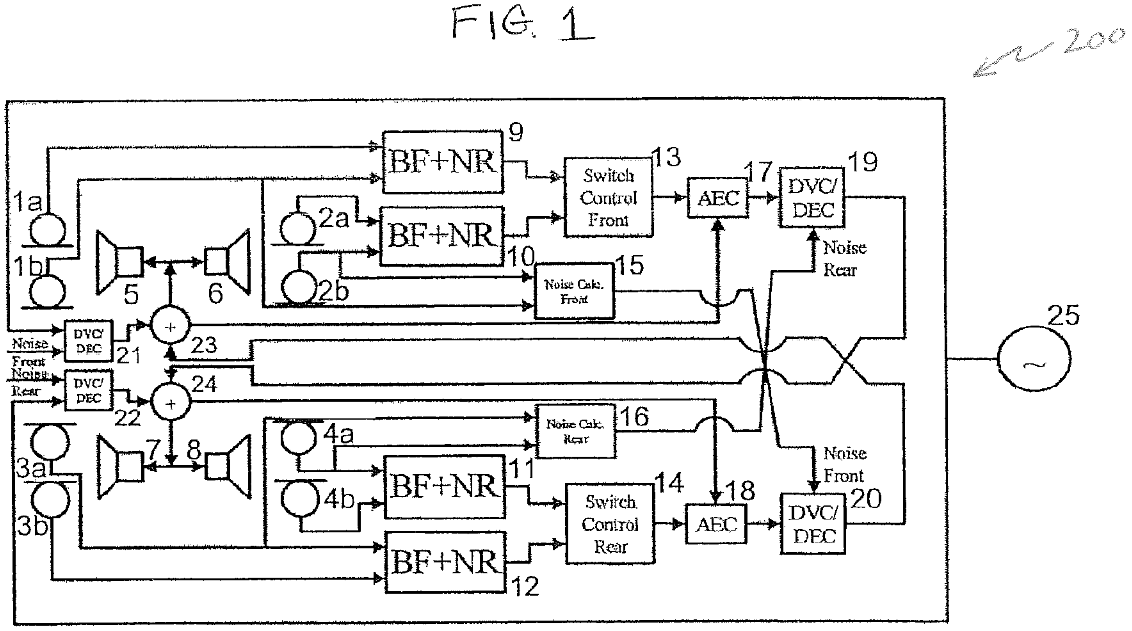
FIG. 2 is a block diagram of one embodiment of a passenger compartment communication system that includes an audio system.

FIG. 2 is a block diagram illustration of an alternative embodiment of the communication system 200 for a passenger compartment of a vehicle in which a "useful" signal (e.g., music) is also reproduced using the audio system to improve the passenger compartment communication between people in various seats. The voice signal which is to be reproduced is adapted, using a location-dependent noise signal as in FIG. 1, to the interference signal present at the desired reproduction location.

Similar to the embodiment in FIG. 1, the communication system in FIG. 2 includes the plurality of microphone pairs 1-4, the plurality of loudspeakers 5-8 (e.g., the loudspeakers for a vehicle entertainment system) and a plurality of signal-processing units. As set forth above, the microphones 1*a* and 1*b* are assigned to (i.e., configured to detect speech from a speaker sitting in) the front left sitting position, the microphones 2*a* and 2*b* are assigned to the front right sitting position, the microphones 3*a* and 3*b* are assigned to the rear left sitting position, and the microphones 4*a* and 4*b* are assigned to the rear right sitting position. The loudspeaker 5 is assigned to the front left sitting position, the loudspeaker 6 is assigned to the front right sitting position, the loudspeaker 7 is assigned to the rear left sitting position and the loudspeaker 8 is assigned to the rear right sitting position.

The plurality of signal-processing units includes the beamforming and noise suppression units 9-12 and the detection and weighting units 13 and 14. The beamforming and noise suppression unit 9 is assigned to (i.e., receives signals from) the front left microphones 1*a* and 1*b*, the beamforming and noise suppression unit 10 is assigned to the front right microphones 2*a* and 2*b*, the beamforming and noise suppression unit 11 is assigned to the rear left microphones 3*a* and 3*b*, and the beamforming and noise suppression unit 12 is assigned to the rear right microphones 4*a* and 4*b*. The detection and weighting unit 13 is connected to the beamforming and noise suppression units 9 and 10 and the detection and weighting unit 14 is connected to beamforming and noise suppression units 11 and 12. In a preferred embodiment, the signal-processing units include the noise level determination units 15 and 16, the echo suppression units 17 and 18, and DVC/DEC units 19 and 20.

In contrast to the embodiment in FIG. 1, the system in FIG. 2 further includes a plurality of signal-processing units 21 and 22 for dynamic volume control and/or frequency equalization control (DVC/DEC) (hereinafter "DVC/DEC units"), a plurality of summing elements 23 and 24, a signal source 25 for generating a useful signal (e.g., a music signal) which is reproduced in the passenger compartment via the loudspeakers.

Referring still to FIG. 2, the microphones 1*a* and 1*b* are connected to the beamforming and noise suppression unit 9. The microphones 2*a* and 2*b* are connected to the beamforming and noise suppression unit 10. The beamforming and noise suppression units 9 and 10 are each disposed upstream of and connected to the detection and weighting unit 13. The detection and weighting unit 13 is disposed upstream of and is connected to the echo suppression unit 17, the output of which is connected to the DVC/DEC unit 19. The output of the DVC/DEC unit 19 is connected to an input of the summing element 24.

Similarly, the microphones 3*a* and 3*b* are connected to the beamforming and noise suppression unit 12. The microphones 4*a* and 4*b* are connected to the beamforming and noise suppression unit 11. The beamforming and noise suppression units 12 and 11 are located upstream of and connected to the detection and weighting unit 14. The detection and weighting unit 14 is disposed upstream of and is connected to the echo suppression unit 18, the output of which is connected to the DVC/DEC unit 20. The output of DVC/DEC unit 20 is connected to a first input of the summing element 23.

The microphones 1*b* and 2*b* are also connected to the noise level determination unit 15, which is disposed upstream and is connected to the DVC/DEC unit 20. Similarly, the microphones 3*a* and 4*a* are connected to the noise level determination unit 16, which is disposed upstream of and is connected to the DVC/DEC unit 19. The signal source 25 is also connected to the DVC/DEC units 21 and 22. The DVC/DEC unit 21 is connected upstream to noise level determination unit 15, and the DVC/DEC unit 22 is connected upstream to the noise level determination unit 16. An output of the DVC/DEC unit 21 is disposed upstream of and is connected to a second input of the first summing element 23. An output of the DVC/DEC unit 22 is disposed upstream of and is connected to a second input of the second summing element 24.

The output of the summing element 23 is provided to the front left and to the front right loudspeakers 5 and 6, and to the echo suppression unit 17. The output of the summing element 24 is provided to the rear left and the rear right loudspeakers 7 and 8 and to the echo suppression unit 18. Thus, each pair of microphones 1-4 is respectively assigned to one of the four sitting positions (i.e., the front left, the front right, the rear left and the rear right sitting positions) such that a beamforming procedure to attenuate interference signal components from other directions may be performed.

In a preferred embodiment, the microphone pairs 1-4 are disposed proximate to the respective position of the speaker (e.g., a driver, etc.). The signal-to-noise ratio between the desired voice signals and undesired interference signal is improved using the aforementioned multi-channel noise reduction techniques. Subsequent processing of the voice signals includes substantially the same measures as described above with reference to FIG. 1. In contrast to the embodiment in FIG. 1, however, the echo suppression units 17 and 18 use the output signals from the summing elements 23 and 24, respectively, as the reference signals for the suppression of echoes. The echo compensated signals generated via the echo suppression units 17 and 18 are subsequently subjected to dynamic volume control (DVC) and/or frequency equalization control (DEC) using known algorithms. As set forth above, the noise level determination units 15 and 16 determine the interference noise level at the location of the desired reproduction (e.g., the front and/or the rear sitting positions) of the voice signals respectively from the rear microphone pairs 3 and 4 and the front microphone pairs 1 and 2. The output signals of the noise level determination units 15 and 16 are respectively used as reference signals for dynamic volume control (DVC) and/or frequency equalization control (DEC) in the DVC/DEC units 20 and 19. The output signal (e.g., a music signal) of the signal source 25 is subjected to dynamic volume control (DVC) and/or frequency equalization control (DEC) in the DVC/DEC units 21 and 22.

The output of the DVC/DEC unit 21 is added to the output signals of the DVC/DEC unit 20 (e.g., the conditioned voice signals for the rear left and the rear right seats) via the summing element 23, the output signal of which is used as the reference signal for the echo compensation in the echo suppression unit 17. Thus, the reference signal accounts for both the voice signal components, which are output at the rear loudspeakers 7 and 8, and the signal components of the signal source 25 during the echo compensation of the voice signal components for the front left and the front right seats. This configuration reduces or prevents the repeated reproduction of both the signal components of the signal source 25 and the voice signal components, and thus undesirable echoes.

Similarly, the output of the DVC/DEC unit 22 is added to the output signal of the DVC/DEC unit 19 (e.g., the conditioned voice signals of the front left and the front right seats) via the summing element 24, the output of which is used as the reference signal for the echo compensation in the echo suppression unit 18. Thus, the reference signal accounts for both the voice signal components, which are output at the front loudspeakers 5 and 6, and the signal components of the signal source 25 during echo compensation of the voice signal components for the rear left and the rear right seats. This configuration reduces or prevents the repeated reproduction of both the signal components of the signal source 25 and the voice signal components, and thus undesirable echoes.

The post-processed and summed signal provided by the summing element 23, which corresponds to the voice signals extracted from the front microphone pairs 1 (front left) and 2 (front right), are reproduced for the occupants of the rear seats via the rear left and the rear right loudspeakers 7 and 8. In a similar fashion, the post-processed and summed signal provided by the summing element 24, which corresponds to the voice signals extracted from the rear microphone pairs 3 (rear left) and 4 (rear right), are reproduced for the occupants of the front seats via the front left and the front right loudspeakers 5 and 6.

Figure 3:
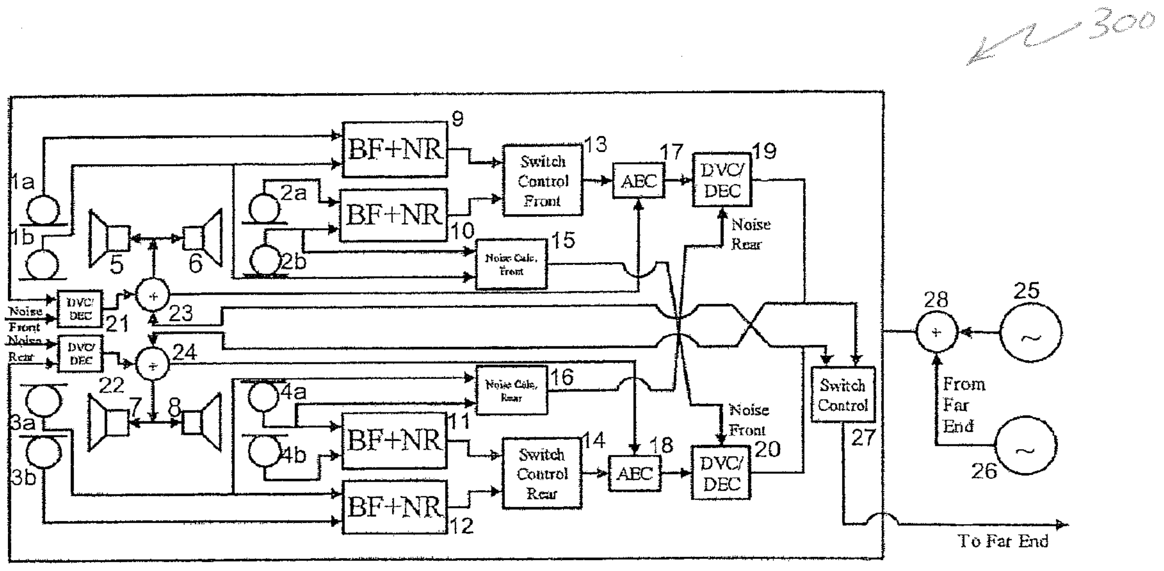
FIG. 3 is a block diagram of one embodiment of a passenger compartment communication system that includes an audio system and a hands-free communication system.

FIG. 3 illustrates another embodiment of a communication system 300 for a passenger compartment of a vehicle. The system is configured in a similar fashion to the system in FIG. 2. In contrast, however, the system in FIG. 3 includes a hands-free system (e.g., a hands-free telephone system), a telephone signal source 26, an additional signal-processing unit 27 for detecting voice signals (hereinafter "voice detection unit") and an additional summing element 28. The DVC/DEC units 19 and 20 are disposed upstream of and are connected to the signal-processing unit 27. The voice detection unit 27 is connected to the hands-free system of the motor vehicle in order to transmit voice signals to a remote speaker (not shown).

The output signal of the signal source 25 is provided to a first input of the summing element 28. The telephone signal source 26, representing a remote subscriber and as such a remote speaker, is connected to a second input of the summing element 28. An output of the summing element 28 is connected to the DVC/DEC units 21 and 22. The voice signal from the remote speaker (e.g., the telephone signal source 26) is mixed with the useful signal (e.g., a music signal) provided by the signal source 25 using the summing element 28. The voice signal of the remote speaker is, therefore, processed in a similar fashion as the signal provided by the signal source 25 in the system in FIG. 2. That is, undesired echoes from the voice signal of the remote speaker are also reduced or suppressed. In this configuration, the audio signal from the signal source can be muted or its volume level can be reduced during communication with the remote speaker; however, such a feature will not negatively influence the echo compensation of the voice signal of the telephone communication.

By using the voice detection unit 27, a signal from the front area or the rear area of the passenger compartment is transmitted to the remote speaker, for example, only when it has relevant or significant voice signal components. The communication system of FIG. 3, therefore, also takes into account whether the person communicating with the remote speaker is in the front or the rear area of the passenger compartment of the vehicle. Furthermore, the voice signal of the speaker is conditioned by one of the DVC/DEC units 19 or 20 in a similar fashion as when the voice signal is output in the passenger compartment, irrespective of which seat said speaker in the vicinity is located on. This allows a voice signal, which can be understood to an optimum degree, to be transmitted to the remote speaker independent of other undesired interference noise in the passenger compartment. This is achieved using a communication system which includes at least four microphone arrays and at least four respective signal-processing arrangements, as well as at least two switching units which react to voice signal components in the signals detected via the microphones.

One advantageous effect of the invention results from the directional effect of the microphone arrays which leads to an improved signal-to-noise ratio of the detected voice signals and from the application of an echo suppression algorithm (AEC —Acoustic Echo Compensation) for reducing echoes in the reproduced voice signal. Further, voice signal components in the signals picked-up by the microphone arrays may be detected and processed such that signals that have a voice signal component may be output for further processing. The voice signal component of more than one microphone array may be summed. This summing may be weighted, for example, in accordance with the amplitude of the voice signal components from more than one microphone array. Yet another (cost) advantage can be obtained where the communication system is combined with an audio system and/or a hands-free device which is already present in the motor vehicle.

Although various embodiments have been disclosed, it will be apparent to those skilled in the art that various changes and modifications can be made which will achieve some of the advantages of the invention without departing from the spirit and scope of the invention. For example, in some embodiments, one or more of the signal-processing units can be combined into a single signal-processing unit. Furthermore, it will be obvious to those reasonably skilled in the art that other components performing the same functions may be suitably substituted. Such modifications to the inventive concept are intended to be covered by the appended claims.

What is claimed is:

1. A communication system for a passenger compartment, comprising:

at least two microphone arrays respectively arranged within first and second regions in the passenger compartment, where each microphone array has at least two microphones and is operable to provide a detected audio signal, and where the first region is different than the second region;

at least two loudspeakers, where each loudspeaker is located within a different one of the first and the second regions; and a signal processor connected to the microphone arrays and to the loudspeakers, where the signal-processor processes the detected audio signals and provides the processed audio signal to the loudspeaker located within the second region, where the signal processor includes at least two switching units, one of which is connected between the microphone array within the first region and the loudspeaker located within the second region, and the other of which is connected between the microphone array within the second region and the loudspeaker located within the first region; and the switching units are adapted to detect voice signal components in the detected audio signals from the microphones, and to selectively output those audio signals which include a voice signal component that is greater than a predetermined threshold value.

2. The system of claim 1, where each switching unit combines the detected audio signals that include the voice signal components that are greater than the predefined threshold value, and outputs the combined signal.

3. The system of claim 2, where the switching units weight the audio signals according to the strengths of their voice signal components, and combine the audio signals based on their weights.

4. The system of claim 1, where the signal processor includes at least two processing units adapted to respectively perform beamforming using the detected audio signals to reduce noise in the audio signals.

5. The system of claim 1, where the passenger compartment is the passenger compartment of a motor vehicle having at least four sitting positions;

the at least two microphone arrays include four microphone arrays, a first microphone array being assigned to a front left sitting position, a second microphone array being assigned to a front right sitting position, a third microphone array being assigned to a rear left sitting position, and a fourth microphone array being assigned to a rear right sitting position.

6. The system of claim 5, where the signal-processing arrangement includes four switching units, a first of which is connected to the microphone array assigned to the front left sitting position, a second of which is connected to the microphone array assigned to the front right sitting position, a third of which is connected to the microphone array assigned to the rear left sitting position, and a fourth of which is connected to the microphone array assigned to the rear right sitting position.

7. The system of claim 5, where the at least two loudspeakers include at least four loudspeakers, one of which is arranged proximate to the front left sitting position, one of which is arranged proximate to the front right sitting position, one of which is arranged proximate to the rear left sitting position, and one of which is arranged proximate to the rear right sitting position.

8. The system of claim 7, where the signal processor includes first and second DVC/DEC units, first and second noise level determination signal-processing units, and first and second echo suppression units;

the first DVC/DEC unit receives a noise level signal from the second noise level determination unit for a rear region of the passenger compartment as a reference signal, uses dynamic volume control and/or frequency equalization control processing to adapt the processed audio signal corresponding to the front region with regard to at least one of volume and frequency response, and supplies a corresponding first conditioned audio signal as an input signal to the loudspeakers located proximate to the rear left and rear right sitting positions and as a reference signal to the second echo suppression signal-processing unit; and the second DVC/DEC unit receives a noise level signal from the first noise level determination unit for a front region of the passenger compartment as a reference signal, uses dynamic volume control and/or frequency equalization control processing to adapt the processed audio signal corresponding to the rear region with regard to at least one of volume and frequency response, and supplies a corresponding second conditioned audio signal as an input signal to the loudspeakers arranged proximate to the rear left and rear right sitting positions and as a reference signal to the first echo suppression signal-processing unit.

9. The system of claim 7, where the signal processor includes first and second DVC/DEC units, and first and second summing elements;

the first DVC/DEC unit receives a noise level signal from a second noise level determination signal-processing unit for a rear region of the passenger compartment as a reference signal, and uses dynamic volume control and/or frequency equalization control processing to adapt the processed audio signal corresponding to the front region with regard to at least one of volume and frequency response, and supplies a corresponding first output signal as a first input signal to the second summing element; and the second DVC/DEC unit receives a noise level signal from a first noise level determination signal-processing unit for a front region of the passenger compartment as a reference signal, and uses dynamic volume control and/or frequency equalization control processing to adapt the processed audio signal corresponding to the rear region with regard to at least one of volume and frequency response, and supplies a corresponding second output signal as a first input signal to the first summing element.

10. The system of claim 9, further comprising at least one signal source that provides a source signal, comprising:

a third DVC/DEC unit receives a source signal from the signal source, uses the noise level signal from the first noise level determination unit for the front region of the passenger compartment as a reference signal, uses dynamic volume control and/or frequency equalization control processing to adapt the source signal with regard to at least one of volume and frequency response, and supplies a corresponding processed source signal as a second input signal to the first summing element;

a fourth signal-processing unit that receives the source signal from the signal source, uses the noise level signal from the second noise level determination unit for the rear region of the passenger compartment as a reference signal, uses dynamic volume control and/or frequency equalization control processing to adapt the source signal with regard to at least one of volume and frequency response, and supplies a corresponding processed source signal as a second input signal to the second summing element;

the first summing element adds the first and the second input signals, and supplies a resulting sum signal as an input signal for the loudspeakers arranged proximate to the rear left and rear right sitting positions and as a reference signal to a first echo suppression signal-processing unit; and the second summing element adds the first and the second input signals, and supplies a resulting sum signal as an input signal to the loudspeakers arranged proximate to the rear left and rear right sitting positions and as a reference signal to a second echo suppression signal-processing unit.

11. The system of claim 9, further comprising a multimedia signal source, a telephone signal source that provides a source signal, a third switching unit and a third summing element, where the third summing element provides a sum signal by adding the source signal and the telephony signal;

a third DVC/DEC unit that receives the sum signal from the third summing element, uses the noise level signal from the first noise level determination unit for the front region of the passenger compartment as a reference signal, uses dynamic volume control and/or frequency equalization control processing to adapt the sum signal with regard to at least one of volume and frequency response, and supplies a corresponding first processed source signal as a second input signal to the first summing element;

a fourth DVC/DEC unit that receives the sum signal from the third summing element, uses the noise level signal from the second noise level determination signal-processing unit for the rear region of the passenger compartment as a reference signal, to use dynamic volume control and/or frequency equalization control processing to adapt the sum signal with regard to at least one of volume and frequency response, and supplies a corresponding second processed source signal as a second input signal to the second summing element;

the first summing element adds the first and the second input signals, and supplies a resulting sum signal as an input signal to the loudspeakers arranged proximate to the rear left and rear right sitting positions and as a reference signal to the first echo suppression unit; and the second summing element is adapted to add the first and the second input signals, and supply a resulting sum signal as an input signal to the loudspeakers arranged proximate to the rear left and rear right sitting positions and as a reference signal to the second echo suppression unit;

the third switching unit is adapted to receive the output signals from the first and the second DVC/DEC signal-processing units, and to transmit the output signals from the first and the second DVC/DEC units which include a voice signal component that is greater than a predetermined threshold value.

12. A method for improving voice communication in an environment subject to interference, comprising:

providing at least four microphone arrays arranged in the environment, each microphone array including at least two microphones, where a first one of the microphone arrays is disposed within a first region;

providing at least four signal-processing arrangements, where each signal-processing arrangement receives at least two audio signals from a respective one of the microphone arrays;

respectively processing the received audio signals using the signal-processing arrangements to provide corresponding processed output signals; and supplying one of the processed output signals from the first one of the microphone arrays to a first one of a plurality of loudspeakers that is disposed within a second region;

where the first region is different than the second region, where providing at least two switching units, where each switching unit receives audio signals from two of the microphone arrays;

detecting, via the switching units, one or more voice signal components in one or more of the received audio signals;

comparing the voice signal components to a threshold value; and respectively outputting, from the switching units, the received audio signals that include the voice signal components that are greater than the threshold value.

13. The method of claim 12, further comprising providing a sum signal for each switching unit that receives two or more audio signals that include the voice signal components that are greater than the threshold value, where the step of respectively outputting outputs the summed signal.

14. The method of claim 13, further comprising:

providing two or more weighted signals for each switching unit that receives two or more processed output signals that include the voice signal components that are greater than the threshold value, where these processed output signals are weighted as a function of their voice signal component strengths; and adding the weighted signals together to provide the summed signal for a respective one of the switching units.

15. The method of claim 12, further comprising beamforming with the received audio signals for each respective microphone arrays using the signal-processing arrangements for reducing noise in the received signals.

16. The method of claim 12, where the environment comprises a passenger compartment of a motor vehicle.

17. The method of claim 16, where one of the microphone arrays is arranged within a front left region of the passenger compartment, another one of the microphone arrays is arranged within a front right of the passenger compartment, another one of the microphone arrays is arranged within a rear left region of the passenger compartment, and another one of the microphone arrays is arranged within a rear right region of the passenger compartment.

18. The method of claim 17, where at least two signal-processing arrangements and at least one switching unit are in communication with the front left and the front right microphone arrays, where at least two signal-processing arrangements and at least one switching unit are in communication with the rear left and the rear right microphone arrays, where one of the switching units provides a sum signal for a front region of the passenger compartment, and where the other one of the switching units provides a sum signal for a rear region of the passenger compartment.

19. The method of claim 18, where one loudspeaker is arranged front left in the passenger compartment, where another loudspeaker is arranged front right in the passenger compartment, where another loudspeaker is arranged rear left in the passenger compartment, and where another loudspeaker is arranged rear right in the passenger compartment, where the method further comprises:

receiving the audio signals from the front left microphone array and the audio signals from the front right microphone array at a noise level detection signal-processing unit for the front region to determine a front noise signal level;

receiving the audio signals from the rear left microphone array and the audio signals from the rear right microphone array at a noise level detection signal-processing unit for the rear region to determine a rear noise signal level;

determining averaged, resulting noise signal levels for at least one of the front and the rear regions of the passenger compartment respectively using the audio signals;

receiving the sum signal for the front region of the passenger compartment at a front echo suppression signal-processing unit;

receiving the sum signal for the rear region of the passenger compartment at a rear echo suppression signal-processing unit;

suppressing acoustic echoes in the sum signal, via the front echo suppression signal-processing unit, for the front region of the passenger compartment using an Automatic Equalizing Control algorithm, and providing a front suppressed signal to a front DVC/DEC signal-processing unit; and suppressing acoustic echoes in the sum signal, via the rear echo suppression signal-processing unit, for the rear region of the passenger compartment using an Automatic Equalizing Control algorithm, and providing a rear suppressed signal to a rear DVC/DEC signal-processing unit.

20. The method of claim 18, further comprising:

adapting the sum signal from the switching unit for the front region of the passenger compartment with regard to at least one of volume and frequency response using dynamic volume control and/or frequency equalization control algorithms, and providing the adapted signal to the loudspeakers arranged within the rear region and to a rear echo suppression signal-processing unit as a reference signal; and adapting the sum signal from the switching unit for the rear region of the passenger compartment with regard to at least one of volume and frequency response using dynamic volume control and/or frequency equalization control algorithms, and providing the adapted signal to the loudspeakers arranged within the front region and to a front echo suppression signal-processing unit as a reference signal.

21. The method of claim 18, further comprising:

adapting the signal from the switching unit for the front region of the passenger compartment with regard to at least one of volume and frequency response using dynamic volume control and/or frequency equalization control algorithms, and providing the adapted signal to a summing element for the rear region of the passenger compartment as a first input signal; and adapting the signal from the switching unit for the rear region of the passenger compartment with regard to at least one of volume and frequency response using dynamic volume control and/or frequency equalization control algorithms, and providing the adapted signal to a summing element for the front region of the passenger compartment as a first input signal.

22. The method of claim 19, further comprising:

receiving a source signal from a signal source and the averaged, resulting noise signal level for the front region as a reference signal, and adapting the source signal with regard to at least one of volume and/or frequency response using dynamic volume control and/or frequency equalization control algorithms, and supplying the adapted source signal as a second input signal to a front summing element;

receiving the source signal from the signal source and the averaged, resulting noise signal level for the rear region as a reference signal, and adapting the source signal with regard to at least one of volume and frequency response using dynamic volume control and/or frequency equalization control algorithms, and supplying the adapted source signal as a second input signal to a rear summing element;

adding, via the front summing element, an output signal from the rear DVC/DEC signal-processing unit and the second input signal, and supplying a resulting sum signal as an input signal for the front left and the front right loudspeakers and as a reference signal for the front echo suppression signal-processing unit; and adding, via the rear summing element, an output signal from the front DVC/DEC signal-processing unit and the second input signal, and supplying the resulting sum signal as an input signal for the rear left and the rear right loudspeakers and as a reference signal for the rear echo suppression signal-processing unit.

23. The method of claim 19, further comprising:

adding output signals from a signal source and a telephone signal source, and supplying a corresponding sum signal via a summing element;

receiving the sum signal from the summing element and the averaged, resulting noise signal level for the front region as a reference signal, adapting the sum signal with regard to at least one of volume and frequency response using dynamic volume control and/or frequency equalization control algorithms, and supplying the adapted source signal as a second input signal to a front summing element;

receiving the sum signal from the summing element and the averaged, resulting noise signal level for the rear region as a reference signal, adapting the sum signal with regard to at least one of volume and frequency response using dynamic volume control and/or frequency equalization control algorithms, and supplying the adapted source signal as a second input signal to a rear summing element;

adding, via the front summing element, an output signal from the rear DVC/DEC signal-processing unit and the second input signal, and supplying a resulting sum signal as an input signal to the front left and the front right loudspeakers and as a reference signal for the front echo suppression signal-processing unit;

adding, via the rear summing element, an output signal from the front DVC/DEC signal-processing unit and the second input signal, and supplying a resulting sum signal as an input signal to the rear left and the rear right loudspeakers and as a reference signal for the rear echo-suppression signal-processing unit;

receiving the output signals from the front and the rear DVC/DEC signal-processing units at a switching unit; and outputting the output signals from the front and the rear DVC/DEC signal-processing units that include a voice signal component that is greater than a predetermined threshold value.

24. A communication system for a passenger compartment of a motor vehicle, the system comprising:

first and second microphone arrays, each microphone array including a plurality of microphones, the first microphone array provides a plurality of first audio signals and is located within a first region, and the second microphone array provides a plurality of second audio signals and is located within a second region, where the first region is different than the second region;

first and second loudspeakers, the first loudspeaker being located within the first region, and the second loudspeaker being located within the second region; and a signal processor that receives the first and the second audio signals, and provides a first conditioned audio signal derived from the first audio signal to the second loudspeaker, where the signal processor comprises first and second beamforming and noise suppression processing units, the first beamforming and noise suppression processing unit provides a first beamformed signal derived from at least one of the first audio signals, and the second beamforming and noise suppression processing unit provides a second beamformed signal derived from at least one of the second audio signals, third and fourth microphone arrays, each including a plurality of microphones, where the third microphone array provides a plurality of third audio signals and is located within a third region, and the fourth microphone provides a plurality of fourth audio signals and is located within a fourth region; and third and fourth loudspeakers, the third loudspeaker being disposed within the third region, and the fourth loudspeaker being disposed within the fourth region;

third and fourth beamforming and noise suppression processing units, where the third beamforming and noise suppression processing unit provides a third beamformed signal derived from at least one of the third audio signals, and the fourth beamforming and noise suppression processing unit provides a fourth beamformed signal derived from at least one of the audio signals; and first and second detection and weighting units, the first detection and weighting unit selectively provide a first output signal derived from at least one of the first and the second beamformed signals when at least one of the first and the second beamformed signals includes a voice signal component that is greater than a first threshold value, and the second detection and weighting unit selectively provides a second output signal derived from at least one of the third and the fourth beamformed signals when at least one of the third and the fourth beamformed signals includes a voice signal component that is greater than a second threshold value.

25. The communication system of claim 24, where the first region surrounds a driver seat, and where the second region surrounds a passenger seat.

26. The communication system of claim 24, where the signal processor comprises:

first and second echo suppression units, where the first echo suppression unit provides a first suppressed signal derived from the first output signal and a second reference signal, and the second echo suppression unit provides a second suppressed signal derived from the second output signal and a first reference signal.

27. The communication system of claim 24, where the signal processor comprises:

first and second noise level detection units, where the first noise level detection unit provides a first noise level signal derived from at least one of the first audio signals and at least one of the second audio signals, and the second noise level detection unit provides a second noise level signal derived from at least one of the third audio signals and at least one of the fourth audio signals; and first and second DVC/DEC processing units, where the first DVC/DEC processing unit provides a first processed signal derived from the first output signal and the second noise level signal, and the second DVC/DEC processing unit provides a second processed signal derived from the second output signal and the first noise level signal.

28. A method for improving voice communication in an environment subject to interference, comprising:

detecting sound in a first region of the environment via a first array of microphones to provide a plurality of first audio signals;

detecting sound in a second region of the environment via a second array of microphones to provide a plurality of second audio signals;

processing at least one of the first audio signals to provide a first conditioned signal and the second audio signals to provide a second conditioned signal via a signal processing arrangement; and selectively reproducing at least one of the first conditioned signal in the second region of the environment via a second loudspeaker and the second conditioned signal in the first region of the environment via a first loudspeaker, where the step of processing further comprises beamforming and suppressing noise for the first audio signals to provide a first beamformed signal;

beamforming and suppressing noise for the second audio signals to provide a second beamformed signal;

detecting sound in a third region of the environment via a third array of microphones to provide a plurality of third audio signals;

detecting sound in a fourth region of the environment via a fourth array of microphones to provide a plurality of fourth audio signals;

beamforming and suppressing noise for the third audio signals to provide a third beamformed signal;

beamforming and suppressing noise for the fourth audio signals to provide a fourth beamformed signal;

selectively providing a first output signal derived from at least one of the first and the second beamformed signals when at least one of the first and the second beamformed signals includes a voice signal component that is greater than a first threshold value; and selectively providing a second output signal derived from at least one of the third and the fourth beamformed signals when at least one of the third and the fourth beamformed signals includes a voice signal component that is greater than a second threshold value.

29. The method of claim 28, where the step of processing further comprises:

providing a first suppressed signal derived from the first beamformed signal and a second reference signal; and providing a second suppressed signal derived from the second beamformed signal and a first reference signal.

30. The method of claim 28, where the step of processing further comprises:

applying dynamic volume control and/or frequency equalization control processing to the first beamformed signal using a second noise level signal as a reference signal to provide a first processed signal; and applying dynamic volume control and/or the frequency equalization control processing to the second beamformed signal using a first noise level signal as a reference signal to provide a second processed signal.

31. The method of claim 28, where the step of processing further comprises:

applying dynamic volume control and/or frequency equalization control processing to the first output signal using a second noise level signal as a reference signal to provide a first processed signal;

applying dynamic volume control and/or the frequency equalization control processing to the second output signal using a first noise level signal as a reference signal to provide a second processed signal;

providing a source signal derived from at least one of an audio system and a communication system;

applying dynamic volume control and/or frequency equalization control processing to the source signal using the first noise level signal as a reference signal to provide a third processed signal;

applying dynamic volume control and/or frequency equalization control processing to the source signal using the second noise level signal as a reference signal to provide a fourth processed signal;

adding the second processed signal and the third processed signal to provide the second conditioned signal; and adding the first processed signal and the fourth processed signal to provide the first conditioned signal.

* * * * *